(12) United States Patent
Kuczera

(10) Patent No.: US 6,550,595 B2
(45) Date of Patent: Apr. 22, 2003

(54) VENTING SYSTEM FOR USE IN A DRIVELINE ENCLOSURE

(75) Inventor: Ramon C. Kuczera, Clarkston, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 09/965,606

(22) Filed: Sep. 27, 2001

(65) Prior Publication Data

US 2003/0057048 A1 Mar. 27, 2003

(51) Int. Cl.⁷ .......................... F16D 47/06; F16D 13/74
(52) U.S. Cl. ................. 192/48.3; 192/36; 192/112; 192/113.3; 74/606 R
(58) Field of Search .................. 192/35, 36, 38, 192/44, 70.12, 48.3, 112, 113.3, 113.32, 113.34; 74/606 R; 220/373, 374

(56) References Cited

U.S. PATENT DOCUMENTS

| | | | |
|---|---|---|---|
| 4,131,188 A | * | 12/1978 | Charchian ............... 192/113.32 |
| 4,185,723 A | * | 1/1980 | Kelbel ........................ 192/36 |
| 4,351,203 A | * | 9/1982 | Fukunaga ................. 74/606 R |
| 4,595,118 A | * | 6/1986 | Azuma et al. ......... 220/203.27 |
| 4,911,035 A | * | 3/1990 | Taguchi ..................... 74/606 R |
| 4,970,913 A | * | 11/1990 | Kielar et al. .............. 74/606 R |
| 6,065,369 A | * | 5/2000 | Kosuge et al. ............ 74/606 R |

FOREIGN PATENT DOCUMENTS

JP 6-221408 A * 8/1994 ............... 74/606 R

* cited by examiner

*Primary Examiner*—Richard M. Lorence
(74) *Attorney, Agent, or Firm*—Mick A. Nylander

(57) ABSTRACT

A vent system for use in a driveline component of an automotive vehicle. The driveline component includes a housing and a bi-directional clutch rotatably supported within the housing. The driveline component includes a vent system which has a vent that is secured to the housing and an orifice within a top portion of the housing. The vent system also includes a recessed pocket formed on an inner surface of the housing at or near the vent. The vent system also includes a grounding element that is arranged within the recessed pocket adjacent to the orifice in the housing of the rear driveline module. The vent system is used to allow for venting of high pressures developed during high speed rotation of driveline modules within a drivetrain system of a automotive vehicle without allowing the expulsion of a lubricating fluid from the oil housing.

4 Claims, 2 Drawing Sheets

VENTING SYSTEM FOR USE IN A DRIVELINE ENCLOSURE

TECHNICAL FIELD

The present invention relates generally to driveline components, and more particularly to an improved vent system for use in fluid filled enclosures for driveline components.

BACKGROUND ART

Drivetrain systems have been known for many years in the automotive industry and other industries, that require power to be transferred to a driving member. In particular, automotive industry drivetrain systems have evolved to the point where a drivetrain may be an all-wheel system, 4-wheel drive system, a front wheel or a rear wheel drive system. These systems are connected to an engine, which provides power, and then to a transmission which will transfer the necessary power to a prop shaft and then on to the half shafts and wheels of the automotive vehicle. The prop shafts are connected to driveline components such as center differentials, rear differentials and front differentials. These driveline components transfer the torque from the engine to each wheel and provide for different speeds of rotation on each wheel depending on the conditions at each wheel. For instance, at a turn the outer wheel spins faster then the inner wheel or if one wheel encounters a slip condition such as that found on loose gravel roads, ice or snow then the other wheel has to compensate by receiving more torque to remove the vehicle from the slip condition at the spinning wheel.

As shown in the prior art most of the driveline components have parts that rotate at very high speeds and thus have to be bathed in a fluid sump for either cooling or lubrication purposes. With these high rotational velocities, pressure and heat tends to build up with in the driveline components thus, a vent is necessary to the atmosphere in many of these driveline enclosures. The venting of the high pressure within the driveline enclosure will allow the enclosure to operate at or as near to atmospheric pressure as possible to ensure longer life of the seals within the driveline components. There have been many attempts to vent driveline components that are bathed in oil. Many of the prior art configurations include an orifice through the housing and a vent member that works by allowing pressure that is being built within the housing of the driveline component to vent to the outer atmosphere. This helps reduce the pressure and further prolong the life of the rotating components and seals used within the driveline components. Generally, the prior art vents are located on a side or top portion of the housing and vary in shape, size and number used to provide the proper venting of the driveline components. The driveline components that frequently need to be vented are either front, rear or center differentials. These differentials have a differential casing that is rotatally supported therein. Furthermore, some of them have clutches and viscous couplings also within the driveline enclosure to provide a smoother transfer of power to the wheels of the automotive vehicle. However, the prior art designs have not addressed all of the problems inhere with the venting system that operates at high speeds and pressures. The driveline components operational speeds are so high that the fluid used to bath and lubricate the components within the housing tends to swirl within the unit. The swirling may cause the fluid to be expelled from the vent in the prior art systems. The fluid being expelled from the vent sometimes results in reduced durability of the driveline component and the internal components of the driveline components. Furthermore, it may allow leaks from the housing that are perceived by the operator of the automotive vehicle. It should also be noted that once the fluid used to bath and lubricate the internal components of the driveline component is reduced in quantity and quality, the internal temperature increases thus reducing the longevity and durability of the driveline components leading to premature failures and unwanted warranty costs for the manufacturers.

Therefore, there is a need in the art for a venting device that is part of a system that allows for the venting of high internal pressures of the driveline components without losing any fluid from expulsion through the vent.

BRIEF SUMMARY OF THE INVENTION

One object of the present invention is to provide a venting mechanism for a driveline component.

Yet another object of the present invention is to reduce the expulsion of lubrication fluid from a driveline component.

It is still another object of the present invention to reduce the occurrence of leaks of lubricating fluid from a driveline component that are perceived by operators of automotive vehicles.

To achieve the foregoing objects a vent system for use in driveline components of a vehicle is disclosed. The vent system includes a vent assembly secured within a housing of the driveline component. The vent system further includes a recessed pocket within an inner surface of a top region of the housing. The vent system also includes a grounding element connected to the clutch of the driveline component and arranged within the recessed pocket of the housing.

One advantage of the present invention is that it provides a venting device for a driveline component that operates under pressure such that the vent device vents any internal pressure to the atmosphere thus prolonging seal and component life within a driveline enclosure.

Still another advantage of the present invention is that the vent is protected by a plate that helps to prevent the expulsion of lubricating fluid from the driveline component.

Still another advantage of the present invention is that the vent system reduces leaks of the lubricating fluid from the driveline component.

Still another advantage of the present invention is that the vent system increases the durability of the drivetrain component and also increases the durability of the internal parts that are cooled and lubricated by the lubricating fluid.

Other objects, features and advantages of the present invention will become apparent from the subsequent description and the appended Claims, taken in conjunction with the accompany drawings.

BEST MODE FOR CARRYING OUT THE INVENTION

Figure 1:
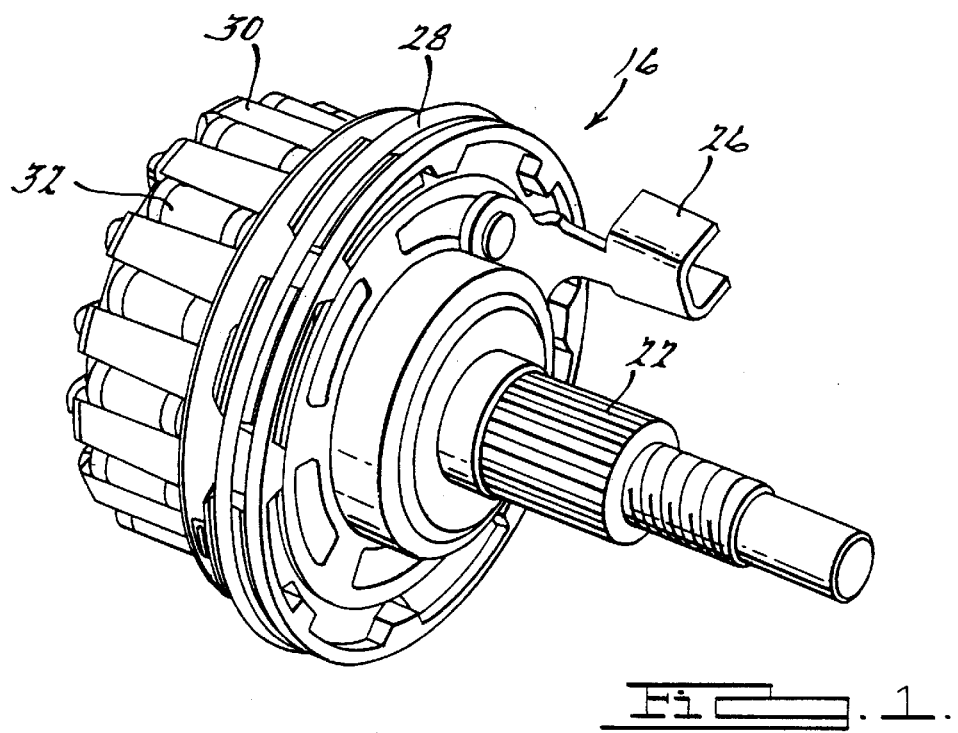
FIG. 1 shows a perspective view of a clutch according to the present invention.

Referring to the drawings, a vent system 10 according to the present invention is shown. The vent system 10 is designed primarily for use in driveline modules or components 12 of a vehicle driveline system. The drivetrain system generally comprises an engine (not shown) that delivers power to a transmission or power take off unit which connects to a prop shaft that delivers the power to the front and rear differential. The rear differential splits that power to half shafts then onto the wheels of the automotive vehicles. Generally, the driveline components 12 may be a center differential, a power take off unit, a rear or front differential, or any of the constant velocity joints or other devices that are used to deliver power to wheels of the automotive vehicle throughout the drivetrain. Many of the driveline components 12 have internal parts that rotate at high speeds and have to be bathed in a lubricating fluid for either cooling or lubrication of the internal parts or seals. With these high speeds, high pressures and temperatures may also develop which makes it necessary to vent the fluid enclosed driveline components 12 to the atmosphere, in order to have near atmospheric pressure achieved within the driveline component 12. This prolongs seal life of the internal components and the driveline component 12. The present invention is a vent system 10 that allows for an exit path for any pressurized gas thus equalizing out the pressure within the driveline component 12 without allowing the escape of the lubricating fluid from the driveline housing 14 or enclosure to the outside surface of the driveline component 12 which appears as a leak to the user of the vehicle.

Figure 2:
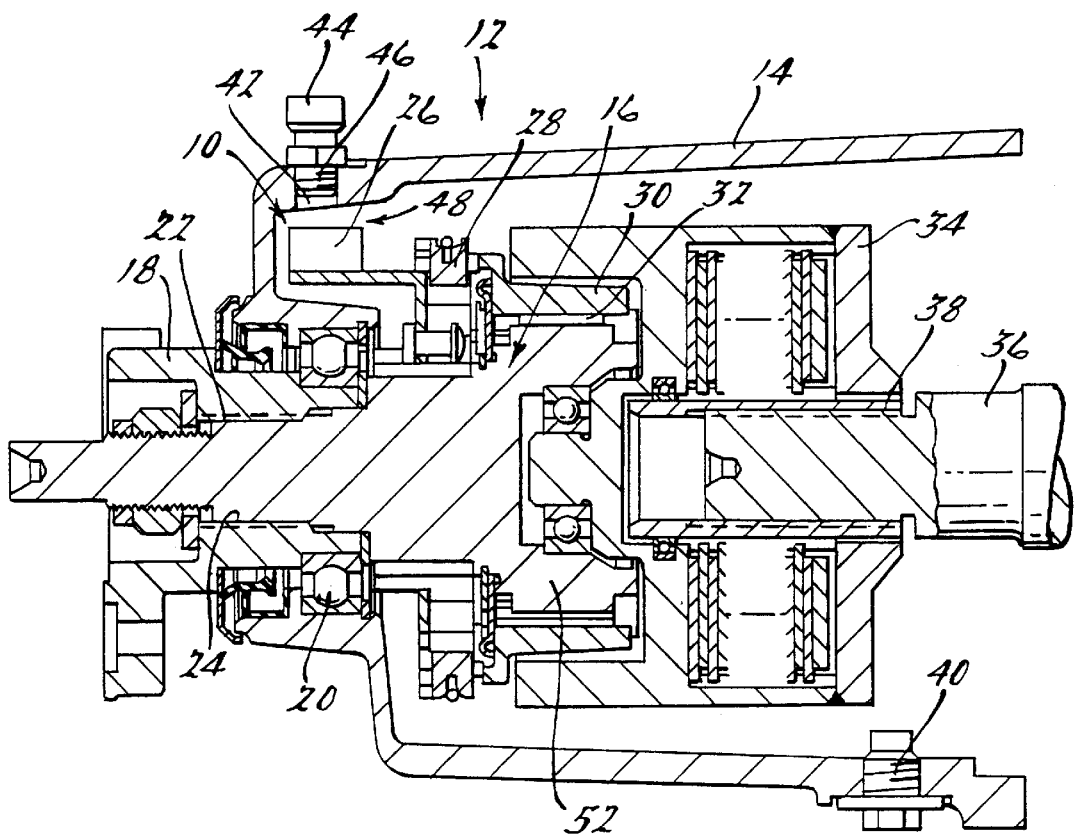
FIG. 2 shows a cross section of the vent system according to the present invention.

FIGS. 1 and 2 show a perspective view of a bi-directional clutch and a partial cross-section of a rear wheel driveline module 12 for a motor vehicle according to the present invention. It should be noted that a driveline module 12 may also be appropriate for a front axle of a vehicle or for an all-wheel or 4-wheel drive vehicle. The rear driveline module 12 includes a housing 14, rotatably supported within the housing 14 is a clutch 16. In one embodiment a bi-directional over running clutch 16 is used however it should be noted any other type of clutch 16 such as a single directional clutch or other types of clutch known in the drivetrain arts may also be used in place thereof. The clutch 16 is secured to a housing flange 18 which is rotatably supported within one end of the housing 14. Bearings 20 provide the rotatable support for the housing flange 18. The bi-directional clutch 16 engages and is rotatably fixed to the housing flange 18 by a plurality teeth 22 on a neck portion. The teeth 22 mate with a series of teeth 24 on an inner surface of the housing flange 18 to create a rotationally fixed union between the flange 18 and the bi-directional clutch 16. The bi-directional clutch 16 also includes a friction grounding element 26 attached to the clutch body. On the outer portion of the friction grounding element 26 are a plurality of friction brake shoes 28 which provide the necessary friction to operate the grounding element 26. Engaging the friction brake shoes 28 is a roller cage 30 which supports and aligns a plurality of rollers 32 around an outer periphery of the clutch body 52 on an end opposite of the housing flange 18. The friction grounding element 26 allows for the required friction torque necessary to be generated to bias the rollers 32 to one side or another of the flat surface of the clutch body 52 thus engaging the differential via the prop shaft rotation in either a forward or reverse direction. A viscous coupling 34, is used in an embodiment, however, it should be noted that any other type of coupling which is capable of smoothing out the torque transfer between a prop shaft and a differential carrier may also be used, The viscous coupling 34 is adjacent to and in contact with the rollers 32 of the bi-direction clutch 16. On an opposite end of the viscous coupling 34 a pinion shaft 36 is inserted and mated with a plurality of teeth 38 to ensure a non rotatable connection between the pinion shaft 36 and the viscous coupling 34. The housing 14 has an orifice 40 located near a bottom portion thereof which is used to drain and change the fluid used to lubricate the rotting parts within the rear driveline component 12.

FIG. 2 also shows the vent system 10 according to the present invention located at or near a top surface of the housing 14. The housing 14 has a vent orifice 42 therethrough at a top surface of the housing 41 wherein that orifice 42 includes a series of threads on an inside surface in one embodiment. It should be noted that the orifice 42 may not include threads therein. Generally, the components within the housing 14 are capable of reaching rotational speeds of well over 5000 rpm during operation of the motor vehicle. These high rotational speeds create higher temperature and pressures that require lubrication to maintain a cool and functional environment for the driveline module 12. Furthermore, at these high operational speeds the lubricating fluid has a tendency to swirl within the module thus causing the fluid to be expelled from any vent or opening if that opening is not properly sealed. It is the fluid expulsion that may result in reduced durability of the driveline module and the overall drivetrain system.

The vent system 10 includes a spring loaded vent assembly 44 that has a threaded portion 46 on one end thereof. The threaded portion 46 is mated with and secured within the threaded vent orifice 42 in the top portion of the housing 14 of the driveline module 12. In one embodiment the vent orifice 42 is cast within the housing 14. The spring loaded vent assembly 44 allows the housing 14 to be sealed from the outside environment and the containments found in that environment. The vent assembly 44 also prevents the ingress of water, road grime and other containments into the housing 14 of the rear driveline module 12. If any water or other containments do enter the driveline module 12 they will infiltrate the inner chamber of the module which will reduce the longevity and durability of the working parts, thus causing premature failure of the driveline module and drivetrain system. Many of these premature failures occur from the increase temperature and pressures within the module. Therefore, the spring loaded vent assembly 44 allows the housing 14 of the rear driveline module 12 to build a predetermined amount of pressure before the vent 44 opens creating an exit allowing for the venting of high pressure internal gas to the outside atmosphere. Furthermore, the spring loaded venting assembly 44 reduces the possibility of fluid expulsion from the rear driveline module 12 by providing approximately a 0.75 PSI of resistance before any venting occurs to the outer atmosphere. It should be noted that this is an approximate PSI resistance to venting and that any venting resistance from as low as 0.1–10 PSI may be used in the driveline module venting system. It should further be noted that the spring loaded venting assembly 44 is used in one embodiment but that any other type of vent known in the art may be used such as any mechanical, electrically controlled or electro mechanical vent.

Figure 3:
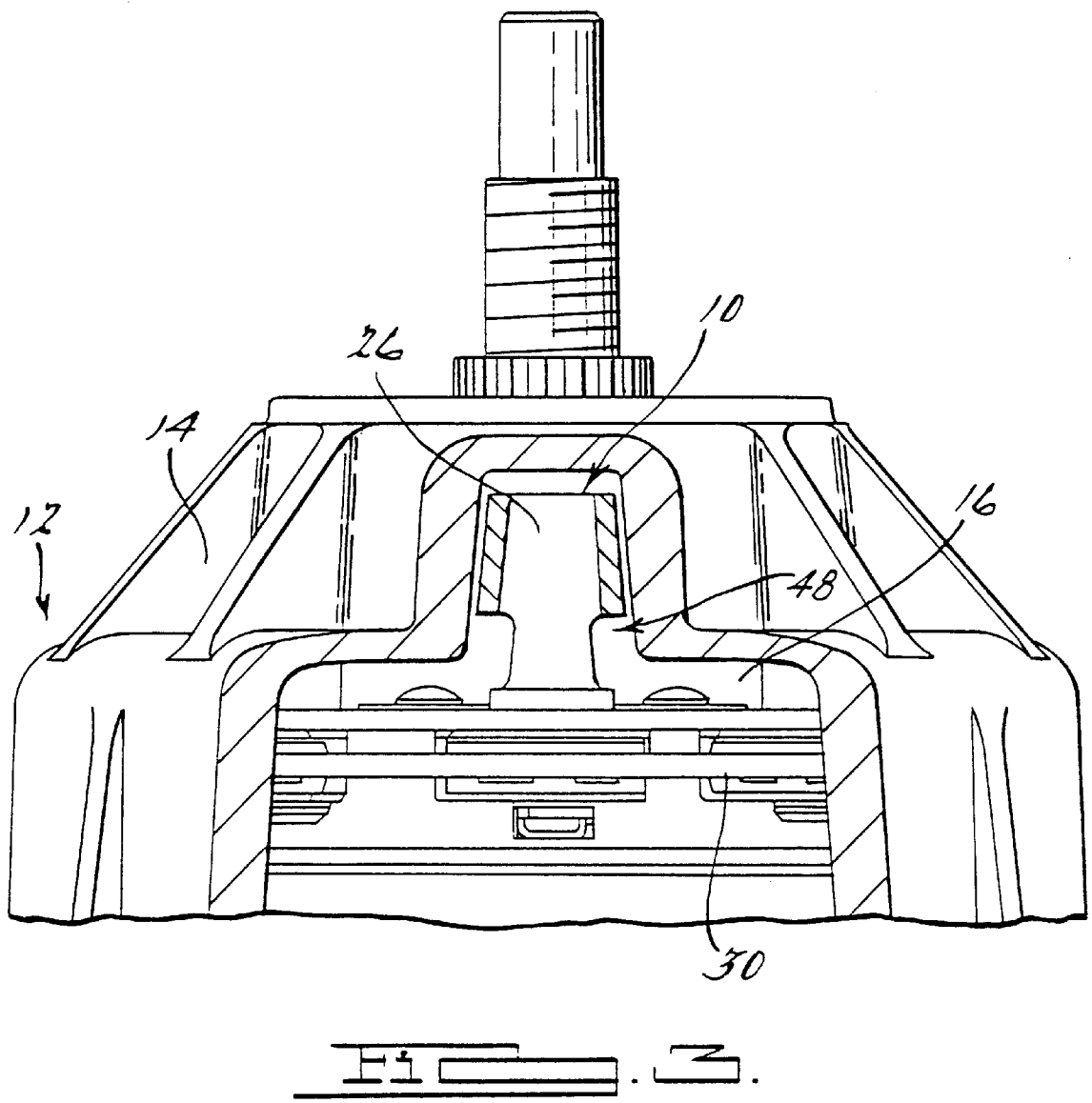
FIG. 3 shows a cut away view of a top portion of a driveline component according to the present invention.

The vent system 10 also includes a recessed pocket 48 formed within an inner surface of the housing 14 adjacent to the vent orifice 42. The pocket 48, is shown in a top view cut away view in FIG. 3, generally forms a u-shaped cross section when viewed from above. The recessed pocket 48 will have the vent orifice 42 at a top surface thereof and the housing material around the other surfaces of the recessed pocket 48. This pocket 48 is designed such that it will receive and hold the friction ground element 26 in an embodiment. The friction ground element 26 generally has a "C" shaped cross-section and is attached to the clutch body of the bi-directional clutch 16. The grounding element 26 is arranged such that the opening of the "C" shaped cross-section extends outward from the bi-directional clutch 16. Thus when the friction ground element 26 is placed within the recessed pocket 48 of the housing 14 the opening of the c-shape section extends towards and faces the vent orifice 42 and the housing 14. The friction ground element 26, therefore will also act as a baffle to deflect and protect the vent orifice 42 and vent assembly 44 from coming in contact with any swirling lubricating fluid of the rear driveline module 12. The friction ground element 26 is connected to the body of the bi-directional clutch 14 by any known securing means and in one embodiment a bolt is used. With the friction ground element 26 protecting the vent assembly 44 from any swirling fluid, it also is angled such that any fluid that does come near or in contact with the vent orifice 42 and vent assembly 44 will drain back to the main sump due to the angle of the surfaces of the "C" shaped ground element. Furthermore, the ground element 26 is designed such that a clear exit path is available to vent any high pressure gas located within the rear driveline module 12 thus keeping the internal pressure of the rear driveline module 12 as close to the atmospheric pressure as possible. It should be noted that the friction ground element 26 in an alternate embodiment may just be in the shape of a flat plate which has a specific angle which will protect the vent assembly 44 from any swirling fluid and also allowing the drainage of any fluid that does enter the vent assembly area to drain back to the sump of the rear driveline module 12. Furthermore, the flat plate or the c-shape friction ground element 26 may also contact a rib and/or plurality of ribs, formed on the inside surface of the housing 14 at or near the vent orifice 42.

The recessed pocket 48 and/or ribs in conjunction with the ground element 26 serve the dual purpose of providing a method to fix the friction ground element 26 to the housing 14 in order to have the bi-directional clutch 16 operate correctly, while also creating a barrier to the swirling lubricating fluid from contacting or being near the vent assembly 44 or vent orifice 42. It should be noted that the angles of the surfaces of either the flat plate or the "C" shaped friction ground element 26 can be changed to accommodate different designs and/or to improve protection of the vent assembly 44 aid the flow of any lubricating fluid away from the vent assembly 44. It should further be noted that the friction ground element 26 is also designed such that it is a predetermined distance away from the surface of the vent assembly 44 and vent orifice 42 such that a meniscus or bubble of the lubricating fluid will not form at or near the vent orifice 42 thus causing leakage of the fluid from the vent assembly 44.

The vent system 10 is designed for a variety of operating conditions by the adjustment of the size of the recessed pocket the angles of the friction ground element 26 and the distance between the friction ground element 26 and the inside surfaces of the recessed pocket 48. Furthermore, it should be noted that in one embodiment all the parts described above are made of a metal material but any other type of hard ceramic or composite material may be used in order to create the vent system 10. The automotive industry is trending towards lighter parts and any sort of composite capable of being molded into a necessary pocket in the oil housing having the necessary rigidity and durability needed for a driveline system may also be used. The vent system 10 may also be designed and made of such compositions. Furthermore, the shown embodiment is for use in a rear driveline module 12 while any other type of module such as a transmission, a power take off unit, a center differential and/or constant velocity joints that need to be vented to relieve any internal pressures developed during the high speed rotation of these devices may also include this vent system 10 on its outer housing.

The present invention has been described in an illustrative manner. It is to be understood that the terminology which has been used is intended to be in the nature of words of description rather than of limitation.

Any modification and variation of the present invention is possible in light of the above teachings. Therefore, within the scope of the appended Claims, the present invention may be practiced otherwise than as specifically described.

What is claimed is:

1. A driveline component for use in a vehicle, said driveline component including:

a housing, said housing having a recessed pocket near a top surface thereof;

a vent assembly secured to said housing at said recessed pocket;

a flange rotatably supported by said housing;

a clutch rotatably fixed and supported within said flange, said clutch having a grounding element extending therefrom wherein said grounding element forms a baffle to prevent a fluid from being expelled through said vent assembly and said grounding element being non rotatable with respect to said housing providing a predetermined resistance to said clutch; and a coupling arranged adjacent to said clutch.

2. The driveline component of claim 1 wherein said grounding element is arranged in said recess pocket adjacent to an orifice in said housing, said orifice having said vent assembly secured therein.

3. The driveline component of claim 2, wherein said grounding element has generally a "C" shaped cross section which protects said vent assembly from contamination by a fluid, while allowing pressure to be released to the atmosphere.

4. The driveline component of claim 2 wherein said grounding element includes a flat plate that interacts with an inner surface of said housing.

* * * * *

UNITED STATES PATENT AND TRADEMARK OFFICE
CERTIFICATE OF CORRECTION

PATENT NO. : 6,550,595 B2
DATED : April 22, 2003
INVENTOR(S) : Ramon Kuczera

It is certified that error appears in the above-identified patent and that said Letters Patent is hereby corrected as shown below:

Column 4,
Lines 32, 34 and 36, delete "containments" and insert -- contaminants --.

Signed and Sealed this

Nineteenth Day of August, 2003

JAMES E. ROGAN
*Director of the United States Patent and Trademark Office*